June 26, 1956     C. M. WEINHOLD     2,751,696

STONE DIGGER

Filed Oct. 8, 1952

Inventor
Clarence M. Weinhold
By Williamson, Williamson, Schroeder & Adams
Attorneys

United States Patent Office 2,751,696
Patented June 26, 1956

2,751,696
STONE DIGGER

Clarence M. Weinhold, Cottonwood, Minn.

Application October 8, 1952, Serial No. 313,705

5 Claims. (Cl. 37—2)

This invention relates to stone digging devices. More particularly, it relates to a device for engaging stones which are beneath the surface of the earth and bringing them to the surface.

It is a general object of my invention to provide a novel and improved stone digging device of cheap and simple construction.

A more specific object is to provide a novel device which, when utilized in conjunction with a tractor equipped with a hydraulically operated loading frame, will provide a cheap and simple stone digging device with increased efficiency in operation.

A still more specific object is to provide a novel device or attachment for a tractor equipped with a hydraulically operated loader frame which can be readily substituted for the scoop portion of the loader to provide a highly efficient and cheap stone digging device.

Another object is to provide an attachment for a tractor equipped with a hydraulically operated loader frame constructed uniquely to provide maximum strength with a minimum of material, cost and weight.

Another object is to provide an attachment for a tractor equipped with a hydraulically operated loader frame which can be readily removed or attached to the frame to provide an efficient and cheap stone digging device, the entire assembly obviating the necessity for purchasing additional heavy and expensive equipment in order to dig stones.

Another object is to provide an attachment for a tractor equipped with a hydraulically operated loader frame which will permit the hydraulic force of the tractor to be utilized to roll a stone upwardly and outwardly to an above surface level instead of lifting the same and in so doing utilizing the lever principle to accomplish the same within a minimum of power and effort.

These and other objects and advantages of my invention will more fully appear from the following description made in connection with the accompanying drawings, wherein like reference characters refer to the same or similar parts throughout the several views, and in which.

Figure 1:
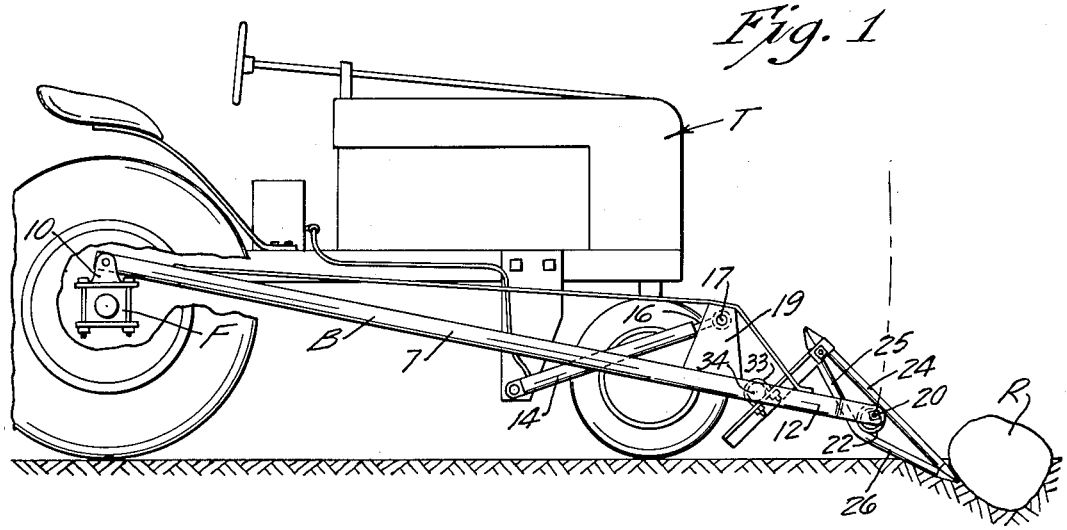
Fig. 1 is a side elevational view of a tractor equipped with one embodiment of my invention.
Figure 2:
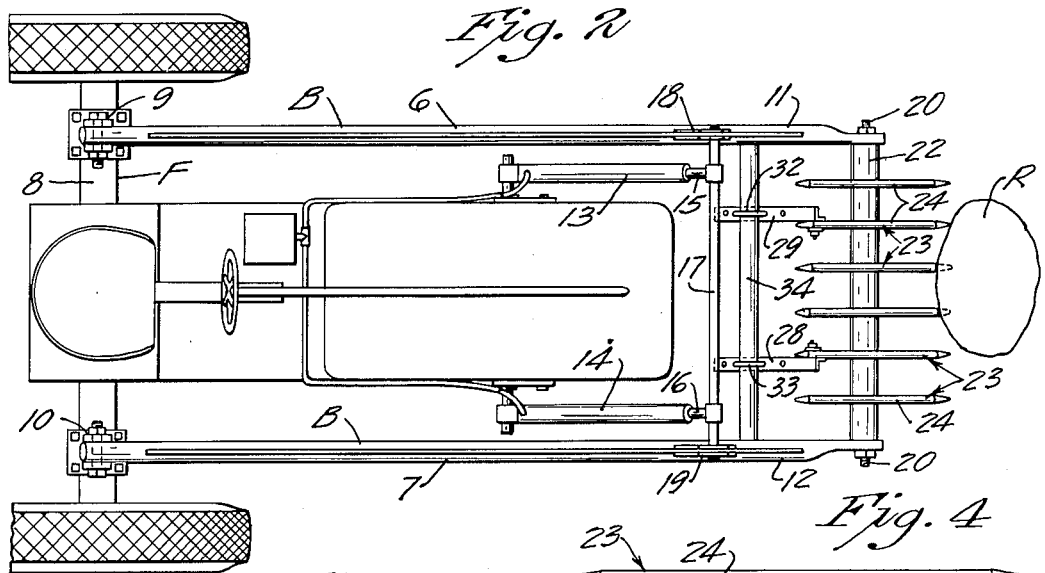
Fig. 2 is a plan view of the same.

One embodiment of my invention, as shown in Figs. 1–5, may include a tractor indicated generally as T having a frame F to which a boom frame indicated generally as B is connected. The boom frame consists of a pair of booms 6 and 7 pivotally mounted by their rear portions on the upper rear portions 8 of the tractor T as at 9 and 10 and extending longitudinally along each side of the tractor as best shown in Fig. 2. The forward end portions 11 and 12 of the booms are swingable vertically to a level below the level of their pivotal mountings at 9 and 10. This can best be seen in Fig. 1.

Pivotally mounted upon opposite sides of the tractor as best shown in Figs. 1 and 2, by their lower end portions, is a pair of hydraulic cylinders 13 and 14 which are connected at their upper and forward ends 15 and 16 to a cross bar 17. This cross bar 17 is mounted in the upper portion of a pair of attachment plates 18 and 19 which in turn are secured by their lower end portions to the booms 6 and 7 respectively. It can be readily seen that these hydraulic cylinders can be utilized to controllably raise and lower the forward end portions of the booms 6 and 7.

Extending between the extreme forward end portions of the booms 6 and 7 is a shaft 20. Mounted on this shaft 20 in encasing relationship between the booms 6 and 7 is a small rigid tube 21. This tube 21 serves as a journal for the digging elements to be hereinafter described. A second and larger rigid tube 22 is fixedly secured to this smaller tube 21 in encasing relationship and also extends between the forward ends of the booms 6 and 7. The tube 21 serves as a journal for the tube 22 and the structure carried by the latter.

Figure 3:
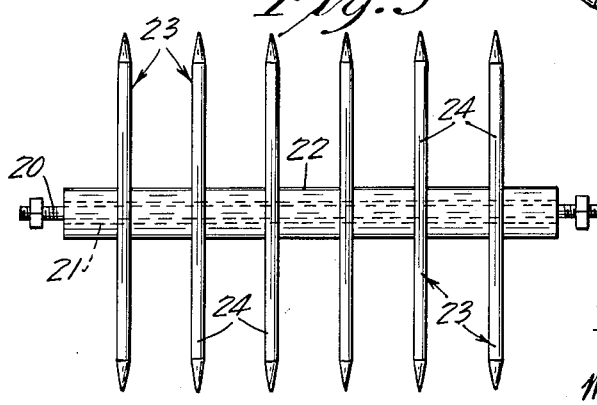
Fig. 3 is a plan view of the attachment showing the teeth and the mounting therefor.
Figure 4:
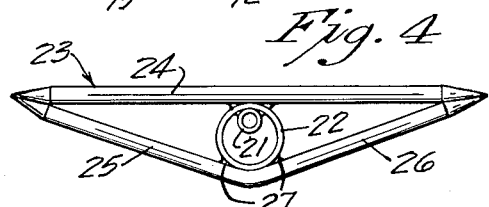
Fig. 4 is an end elevational view of the attachment showing the mounting and the manner in which the teeth are secured thereto.

Mounted on the outer rigid tube 22 are a plurality of generally triangularly shaped teeth indicated generally as 23. These triangularly shaped teeth include a base side 24 and a pair of leg sides 25 and 26. As best shown in Fig. 4, the base side 24 is welded to one side of the larger tube 22 by its medial portion and the leg sides 25 and 26 meet and are secured to the rigid tube 22 at the opposite side as at 27. The base side 24 and the legs 25 and 26 are preferably welded together at their ends and are welded to the rigid tube 22 to provide added strength. It will be noted that the tooth structures 23 are pointed at each end of the base side 24 and they are spaced longitudinally of the tubular member 22 as best shown in Figs. 2 and 3. The larger tube 22 serves as a bracer between the elements 24, 25 and 26 to lend rigidity and strength thereto.

Figure 5:
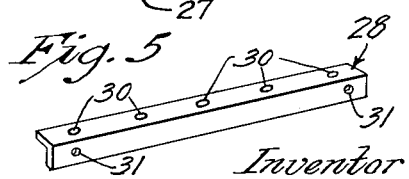
Fig. 5 is a brace strap utilized to adjustably fix the teeth at a desired angle relative to the boom frame.

To secure the teeth structures 23 at the desired angle relative to the booms 6 and 7, I provide a pair of bracer mechanisms which include a pair of angle irons 28 and 29 which have apertures 30 and 31 formed therein, as best shown in Fig. 5. Clamps 32 or 33 are utilized to secure one end of the straps 28 and 29 to a cross bar 34 which is rigidly affixed between the forward end portions of the booms 6 and 7 but rearwardly of the shank 20. The other ends of these angle iron bars 28, 29 are secured to the rearward ends of at least two of the teeth by bolts as best shown in Fig. 2, these bolts passing through the opening between the base side 24 and leg 25 and utilizing washers to secure the same thereto.

In operation, the scoop portion (not shown) of the loader frame B is removed from between the forward end portions of the frame and the shaft 20 is inserted through the tube 21 and through the extreme forward ends of the booms 7 and 6 and secured to the former as best shown in Fig. 2. The desired angle of the teeth 23 to the booms 6 and 7 is determined and they are secured in such position by adjusting the clamps 32 and 33 relative to the angle plates 28 and 29 to clamp the teeth in the desired position. Thereafter, the device is ready for use to quickly, easily and efficiently bring rocks to the surface. This is accomplished by lowering the booms 6 and 7 until the lower and forwardly extending ends of the teeth 23 engage the ground and support the boom frames at a point a short distance behind the rock to be surfaced. By driving the tractor forwardly the forward and lower ends of the teeth 23 dig into the dirt and move downwardly behind and beneath the rock R as best shown in Fig. 1. After the teeth have been inserted as shown in Fig. 1, the rock can be readily and easily surfaced by merely causing the hydraulic assemblies 13 and 14 to lift the booms 6 and 7 whereupon the rock R will be rolled forwardly and upwardly to the surface. The arc line as shown in a broken line in Fig. 1, illustrates how the forward ends of the boom frames move forwardly as well as upwardly when the hydraulic cylinders 13 and 14 are operated. Thus it can be readily seen that it is a simple matter to cause such a rock to be surface since the lever principle is utilized and since the entire operation can be conducted by the operator of the tractor while remaining on the tractor.

It should be noted that this device can be constructed and manufactured as an integral part of a stone digging device or it may be manufactured as an attachment for a loader frame which is already in many cases, a portion of the equipment owned by the owner of the tractor. It is a simple and quick operation to remove the scoop portion and substitute therefor the teeth structure shown in Figs. 3 and 4 and when this substitution has been accomplished, a highly efficient stone digging device is attained.

It should also be noted that the use of a large rigid tubular member 22 welded between the base side 24 and the legs 25 and 26 provides the maximum in strength with a minimum in material and hence in weight and manufacturing costs. The use of a tubular member gives the legs 25 and 26 the necessary angulation to support the extreme stress brought to bear against the ends of the teeth structures while in use and at the same time is light in weight. In addition, the tubular member itself is sufficiently strong because of its tubular character to provide the necessary support.

Another advantage of my device is that it is reversible so that either end of the base side 24 may be used as the engaging portion. To accomplish this, the shaft 20 need only be withdrawn, the attachment turned end for end, and the shaft 20 reinserted.

It will, of course, be understood that various changes may be made in the form, details, arrangement and proportions of the various parts without departing from the scope of my invention.

What is claimed is:

1. A stone digger attachment for use upon a boom frame pivotally mounted upon the upper rear portion of a tractor frame and extending forwardly along opposite sides of the tractor and including a pair of booms having extreme forward end portions controllably swingable vertically and having a shaft extending transversely between the forward end portions thereof, said digger attachment comprising a small rigid tubular member adapted to be mounted on such a shaft in closely encasing relation between such booms, a second and larger rigid tubular member fixedly secured to said first tubular member and surrounding the same, a plurality of rigid teeth members mounted on said tubular member in spaced relation to each other along its length and extending transversely thereof and outwardly therefrom and including a plurality of elongated brace elements each extending between the forward end of one of said teeth and said second tubular member and being fixedly connected thereto on an opposite side thereof relative to the remainder of the teeth structure, and means for securing said teeth in downwardly and outwardly extending position relative to said boom frame and against movement relative to said boom frame and said shaft whereby said teeth may be utilized to surface rocks when such boom frame is mounted upon a tractor with hydraulic cylinder assemblies for controllably raising and lowering such a boom frame.

2. A stone digger attachment for use upon a boom frame pivotally mounted upon the upper rear portion of a tractor frame and extending forwardly along opposite sides of the tractor and including a pair of booms having extreme forward end portions controllably swingable vertically and having a shaft extending transversely between the forward end portions thereof, said digger attachment comprising a small rigid tubular member adapted to be mounted on such shaft in closely encasing relation between such booms, a second and much larger rigid tubular member surrounding said first tubular member, a plurality of rigid teeth members mounted by their medial portions upon said larger tubular member in spaced relation to each other along its length and extending transversely thereof, said teeth members having portions thereof extending outwardly therefrom in opposite directions and including bracer elements extending from opposite ends of said teeth toward said second tubular member and meeting at the opposite side thereof relative to the remainder of said teeth members and rigidly affixed thereto, and means for securing said teeth against movement relative to such boom frame and said shaft so that the forwardmost portions thereof extend downwardly and outwardly from said tubular members and relative to such boom frame whereby said teeth may be utilized to surface rock when such a boom frame is mounted upon a tractor with a hydraulic cylinder assembly for controllably raising and lowering such a boom frame.

3. A stone digger attachment for use upon a boom frame pivotally mounted upon the upper rear portion of a tractor frame and extending forwardly along opposite sides of the tractor and including a pair of booms having extreme forward end portions controllably swingable vertically and having a shaft extending transversely between the forward end portions thereof, said digger attachment comprising a rigid tubular member adapted to be mounted upon such a shaft in encasing and relatively rotatable relation between such booms, a plurality of triangularly shaped tooth structures fixedly mounted upon said tubular member and spaced transversely along its length, the base sides of said triangular tooth structures being fixedly mounted at their medial portions upon said tubular member and extending forwardly and rearwardly therefrom, the leg sides of said triangularly shaped tooth structures serving as brace elements and meeting at the opposite side of said tubular member relative to the point where the base side is connected thereto and being fixedly secured thereto, and bracer structure extending between the upper and rearward ends of at least some of said teeth structures and the boom frame and fixedly secured to each.

4. A stone digger attachment for use upon a boom frame pivotally mounted upon the upper rear portion of a tractor frame and extending forwardly along opposite sides of the tractor and including a pair of booms having extreme forward end portions controllably swingable vertically and having a shaft extending transversely between the forward end portions thereof, said digger attachment comprising a small rigid tubular member adapted to be mounted on said shaft in encasing relation between such booms, a second and much larger rigid tubular member fixedly secured to said first mentioned tubular member and surrounding the same and adapted to extend between such booms, a plurality of generally triangularly shaped tooth structures fixedly mounted upon said larger tubular member, the base sides of said tooth structures being fixedly secured by their medial portions to one side of said larger tubular member, the leg sides of said triangularly-shaped tooth structures meeting at the opposite side of said larger tubular member and being fixedly secured thereto and serving as bracer elements for the base sides of said structures, and bracer structure extending between the upper and rearward end of at least some of said tooth structures and the boom frame and fixedly secured to both.

5. A stone digger having in combination a tractor having a frame, a pair of transversely spaced booms extending longitudinally of said frame and being pivotally connected by their rear portion upon the rear portions of said frame and at opposite sides thereof, hydraulic means for controllably raising and lowering the forward end portions of said booms, the forward end portions of said booms being swingable to a level adjacent the ground and lower than their rearward end portions, a shaft extending transversely between the extreme forward end portions of said booms and secured thereto, a small rigid tubular member mounted on said shaft in closely encasing relation between said booms, a second and larger rigid tubular member fixedly secured to said first tubular member and surrounding the same, a plurality of generally triangularly shaped rigid teeth members fixedly mounted on opposite sides of said second tubular member and in spaced relation to each other along its length and extending transversely thereof and outwardly therefrom, and means for securing said teeth in downwardly and outwardly extending positions relative to said boom frame and against movement relative to said boom frame and said shaft whereby said teeth may be utilized to surface rocks when such boom frame is controllably raised by said hydraulic means.

References Cited in the file of this patent

UNITED STATES PATENTS

| | | |
|---|---|---|
| 644,002 | Cluxton | Feb. 20, 1900 |
| 1,023,736 | Harman | Apr. 16, 1912 |
| 1,473,003 | Berry | Nov. 6, 1923 |
| 1,919,075 | Rasmussen | July 18, 1933 |
| 2,073,992 | Lower | Mar. 16, 1937 |
| 2,284,178 | Sublett | May 26, 1942 |
| 2,322,115 | Cox et al. | June 15, 1943 |
| 2,491,208 | Price et al. | Dec. 13, 1949 |
| 2,506,662 | Cusenbary | May 9, 1950 |
| 2,508,284 | Oliver | May 16, 1950 |
| 2,624,959 | Anderson | Jan. 13, 1953 |
| 2,624,998 | Choate | Jan. 13, 1953 |